US011377162B2

(12) United States Patent
Ding et al.

(10) Patent No.: US 11,377,162 B2
(45) Date of Patent: Jul. 5, 2022

(54) SOFT BIOMIMETIC LEGGED ROBOT

(71) Applicant: Harbin Institute of Technology, Haerbin (CN)

(72) Inventors: Liang Ding, Haerbin (CN); Haibo Gao, Haerbin (CN); Lizhou Niu, Haerbin (CN); Yang Su, Haerbin (CN); Zongquan Deng, Haerbin (CN); Nan Li, Haerbin (CN); Zhen Liu, Haerbin (CN)

(73) Assignee: HARBIN INSTITUTE OF TECHNOLOGY, Haerbin (CN)

( * ) Notice: Subject to any disclaimer, the term of this patent is extended or adjusted under 35 U.S.C. 154(b) by 256 days.

(21) Appl. No.: 16/826,318

(22) Filed: Mar. 23, 2020

(65) Prior Publication Data
US 2020/0391814 A1 Dec. 17, 2020

(30) Foreign Application Priority Data

Jun. 11, 2019 (CN) .......................... 201910499228.2

(51) Int. Cl.
B62D 57/02 (2006.01)
B25J 18/06 (2006.01)

(52) U.S. Cl.
CPC .............. B62D 57/02 (2013.01); B25J 18/06 (2013.01)

(58) Field of Classification Search
CPC ................................. B62D 57/02; B25J 18/06
See application file for complete search history.

(56) References Cited

U.S. PATENT DOCUMENTS

| 4,202,423 | A | * | 5/1980 | Soto | B62D 57/02 701/1 |
| 4,565,487 | A | * | 1/1986 | Kroczynski | B60F 3/00 414/730 |
| 4,738,583 | A | * | 4/1988 | Macconochie | B62D 57/02 901/33 |
| 5,121,805 | A | * | 6/1992 | Collie | B62D 57/024 446/469 |
| 5,219,410 | A | * | 6/1993 | Garrec | B62D 57/02 180/8.1 |
| 5,758,734 | A | * | 6/1998 | Hong | B62D 57/02 901/1 |
| 5,762,153 | A | * | 6/1998 | Zamagni | B62D 57/032 901/1 |
| 5,807,011 | A | * | 9/1998 | Hong | B62D 57/02 403/53 |

(Continued)

Primary Examiner — David M Fenstermacher

(57) ABSTRACT

A soft biomimetic legged robot is provided in the present invention, including a plurality of soft robotic arms. The soft robotic arms include a plurality of motion units, and each of the motion units includes one or more of a twist module, an extension module, a contraction, and a bending module. The plurality of motion units is combined to achieve a full-posture motion of the soft robotic arms. By using soft robotic arms composed of different motion units, the soft biomimetic legged robot of the present invention can not only realize the underwater swimming and crawling, but the crawling on land or slopes, thereby adapting to more complicated environments and achieving richer functions. The motion posture is not limited to a single bending, twisting, extension, and shortening. The soft robotic arm can achieve full-posture movements, and its motion type is more complete.

18 Claims, 5 Drawing Sheets

(56) References Cited

U.S. PATENT DOCUMENTS

| | | | | |
|---|---|---|---|---|
| 6,462,498 B1* | 10/2002 | Filo | ............... | A63H 11/20 |
| | | | | 446/355 |
| 6,588,701 B2* | 7/2003 | Yavnai | ............... | G05D 1/0038 |
| | | | | 244/23 B |
| 6,870,343 B2* | 3/2005 | Borenstein | ............... | B08B 9/045 |
| | | | | 318/567 |
| 8,657,042 B2* | 2/2014 | Mantzel | ............... | B62D 57/02 |
| | | | | 180/8.5 |
| 9,222,493 B2* | 12/2015 | Riskas | ............... | F15B 21/085 |
| 10,899,402 B2* | 1/2021 | Sun | ............... | B62D 57/032 |
| 10,940,582 B2* | 3/2021 | Wang | ............... | B25J 9/102 |
| 2005/0151496 A1* | 7/2005 | Furuta | ............... | B62D 57/02 |
| | | | | 318/568.12 |
| 2014/0305716 A1* | 10/2014 | Kong | ............... | B25J 9/161 |
| | | | | 901/1 |

\* cited by examiner

SOFT BIOMIMETIC LEGGED ROBOT

BACKGROUND OF THE INVENTION

Field of the Invention

The present invention relates to the field of robots, in particular to a soft biomimetic legged robot.

Description of Related Art

As the robot industry develops rapidly, robotic technology has been applied to various fields, but the robot's motion in rough terrain or steep terrain is very limited due to the limitations of the traditional rigid robotic structure. The traditional rigid robots have disadvantages such as heavy structure, large noise, low reliability, low safety factor, and poor environmental adaptability, thereby being difficult to fully adapt to social needs such as medical rehabilitation, emergency rescue, human-machine safety interaction, and complex environmental surveys. Due to the softness and deformability of the soft material itself, the soft robot, theoretically, has infinitely many degrees of freedom, so that it has attracted the attention of scholars in recent years.

However, in the existing soft robots, the soft robotic arms have difficulty in achieving multi-attitude composite motion, which is inconvenient for moving and operating operations under complicated working conditions.

SUMMARY OF THE INVENTION

The problem solved by the present invention is that, in the existing soft robots, it is difficult for the soft mechanical arm to realize multi-posture composite movement, and it is inconvenient to perform movement and operation under complicated working conditions.

In order to solve the above problem, a soft biomimetic legged robot is provided in the present invention, including a plurality of soft robotic arms. The soft robotic arms include a plurality of motion units, and each of the motion units includes one or more of a twist module, an extension module, a contraction, and a bending module. The plurality of motion units is combined to achieve a full-posture motion of the soft robotic arms.

In one embodiment, the twist modules include a first elastic substrate, a counter-clockwise twist actuator, and a clockwise twist actuator; each of the counter-clockwise twist actuator and the clockwise twist actuator includes a plurality of actuators. The counter-clockwise twist actuators are symmetrically disposed on the first elastic substrate in a left-handed manner along a central axis of the first elastic substrate, and the clockwise twist actuators are symmetrically disposed on the first elastic substrate in a right-handed manner along the central axis of the first elastic substrate.

In one embodiment, each of the counter-clockwise twist actuator and the clockwise twist actuator includes one of a shape memory alloy spring drive, a linear drive, a pneumatic drive, or a dielectric high elastomer drive.

In one embodiment, the extension modules include a second elastic substrate and extension actuators. The extension actuators are in a ring shape, and the extension actuators are uniformly disposed on the second elastic substrate along a generatrical direction of the second elastic substrate.

In one embodiment, the extension actuators include one of a shape memory alloy spring drive and a chemical-reaction drive.

In one embodiment, the contraction modules include a third elastic substrate, contraction actuators, and stoppers. The contraction actuators include a plurality of actuators, and the contraction actuators are symmetrically disposed on the third elastic substrate along a central axis of the third elastic substrate. The stoppers are disposed on the third elastic substrate, and connected to one end of the contraction actuators.

In one embodiment, the contraction actuators include one of the shape memory alloy spring drive and the linear drive.

In one embodiment, the bending modules include a fourth elastic substrate and bending actuators. The bending actuators include a plurality of actuators. The bending actuators are uniformly disposed on the fourth elastic substrate along a central axis of the fourth elastic substrate, and the bending actuators are parallel to a generatrical direction of the fourth elastic substrate.

In one embodiment, the bending actuators include one of the shape memory alloy spring drive, the linear drive, a pneumatic drive, and a dielectric high elastomer drive.

In one embodiment, the adjacent motion units are integrally formed or detachably connected with each other.

In one embodiment, hoses are disposed in the motion units, and the hoses are filled inside with solid particles. When the inside of the hoses is evacuated, the solid particles contact each other to squeeze, so that the rigidity of the soft robotic arms increases.

In one embodiment, the motion units at an end of the soft robotic arms include pneumatic suckers, and the pneumatic suckers are disposed uniformly on an outer surface thereof along a generatrical direction of the motion units.

In one embodiment, at least two of the soft robotic arms are operating arms, and the operating arms include sensor module groups. The sensor module groups include a recognition sensor, a distance sensor, a proximity sensor, a pressure sensor, and a slip sensor. The recognition sensor is configured to detect basic attributes such as a shape and a color of a target object. The distance sensor is configured to detect information such as a position, an angle and a distance of the target object. The proximity sensor is configured to detect information such as a motion and a position of the target object. The pressure sensor is configured to detect information such as a magnitude and a distribution of a pressure when the target object is held. The slip sensor is configured to detect a degree of slip when the target object is held.

In one embodiment, the soft robotic arms include two motion units, which are a twist arm unit and a telescopic arm unit, respectively, and the twist arm unit is detachably connected to the telescopic arm unit through a connecting member. The twist arm unit includes the twist modules and the bending modules to achieve twisting and bending. The telescopic arm unit includes the extension modules, the contraction modules, and the bending modules, to achieve extension, contraction and bending, respectively.

In one embodiment, the soft robotic arms include three motion units sequentially disposed along an extending direction of the robotic arms, which are a root motion unit, a middle motion unit, and an end motion unit. The root motion unit includes the bending modules and the contraction modules to achieve bending and contraction, respectively. The middle motion unit includes the bending modules and the contraction modules to achieve bending and contraction, respectively. The end motion unit includes the bending modules and the twist modules to achieve bending and twisting, respectively.

In one embodiment, the soft robotic arms include three motion units sequentially disposed along the extending direction of the soft robotic arms, which are a root motion unit, a middle motion unit, and an end motion unit. The root motion unit includes the bending modules and the twist modules to achieve bending and twisting, respectively. The middle motion unit includes the bending modules and the contraction modules to achieve bending and contraction, respectively. The end motion unit includes the bending modules and the extension modules to achieve bending and extension, respectively.

In one embodiment, the soft robotic arms include six motion units sequentially disposed along the extending direction of the soft robotic arms, which are a first motion unit, a second motion unit, a third motion unit, a fourth motion unit, a fifth motion unit, and a sixth motion unit. The first motion unit includes the bending modules and the contraction modules to achieve bending and contraction, respectively. The second motion unit includes the bending modules and the twist modules to achieve bending and twisting, respectively. The third motion unit includes the bending modules and the extension modules to achieve bending and extension, respectively. The fourth motion unit includes the contraction modules and the twist modules to achieve contraction and twist, respectively. The fifth motion unit includes the contraction modules and the extension modules to achieve contraction and extension, respectively. The sixth motion module includes the extension modules and the twist modules to achieve extension and twisting, respectively.

Compared with the prior art, the present invention has the following beneficial effects.

1. By using soft robotic arms composed of different motion units, the soft biomimetic legged robot of the present invention can not only realize the underwater swimming and crawling, but the crawling on land or slopes, thereby adapting to more complicated environments and achieving richer functions.

2. The motion posture is not limited to a single bending, twisting, extension, and shortening. The soft robotic arm can achieve full-posture movements, and its motion type is more complete.

The modular thought is used to design the structure of the soft robotic arm. Through different modules to achieve extension, shortening, bending, twist and other forms of movements. The use of modular segmented drives takes into account the integrity of movement and the ease of control of the soft robotic arm, which avoids the problems that the structure is too complicated and the size is too large due to too many drivers are integrated on the same soft robotic arm.

BRIEF DESCRIPTION OF THE DRAWINGS

Aspects of the present invention are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE PREFERRED EMBODIMENTS

To enable the above objects, features and advantages of the present invention to be more apparent and easily understood, the specific embodiments of the present invention will be further elaborated hereafter in connection with the drawings.

Figure 1:
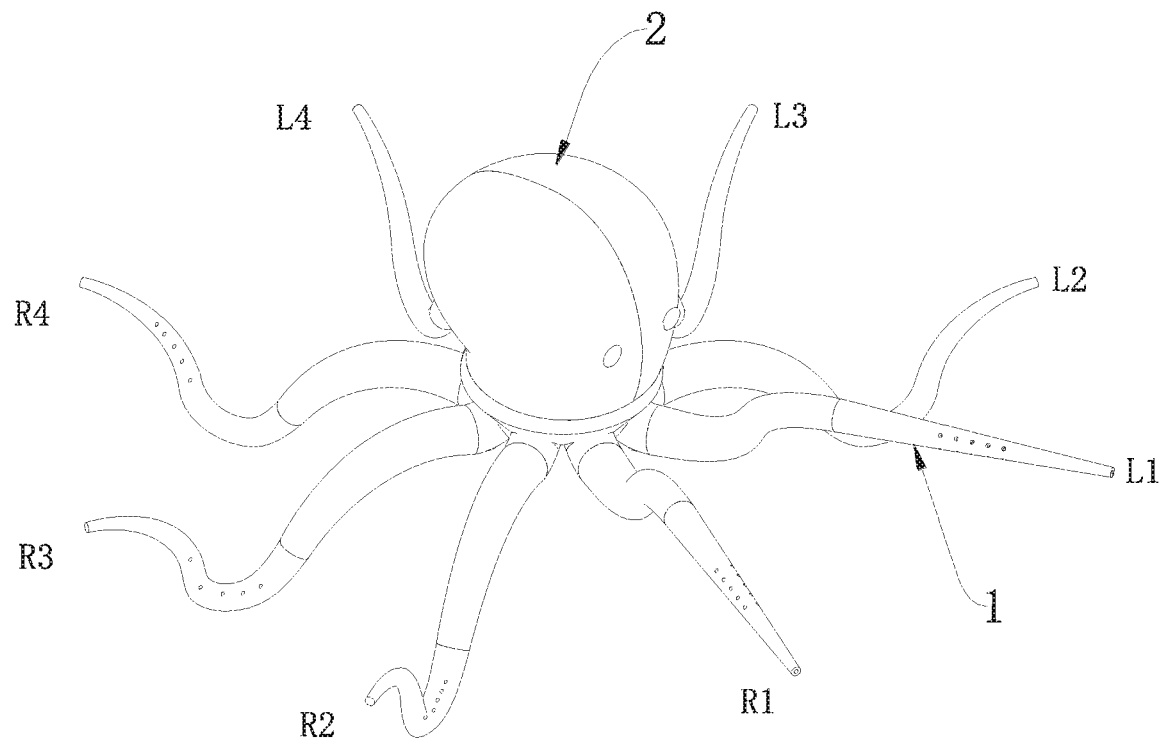
FIG. 1 is a structural diagram of a soft biomimetic legged robot according to an embodiment of the present invention.
Figure 2:
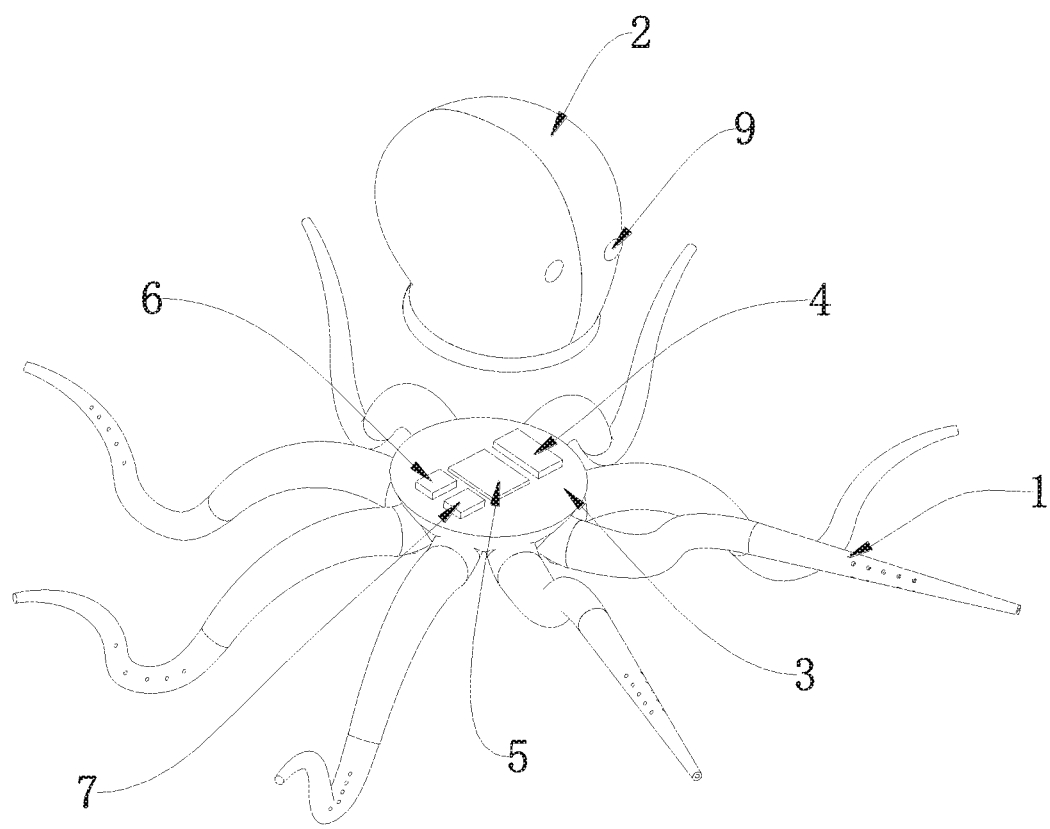
FIG. 2 is a partial explosion diagram of FIG. 1.
Figure 3:
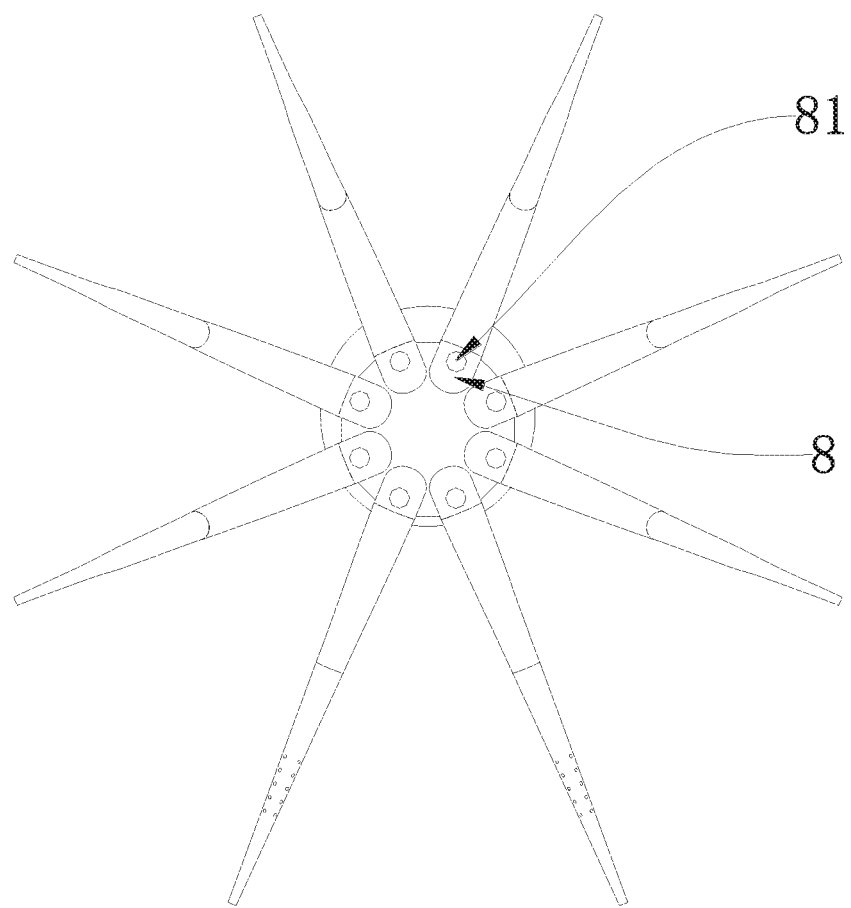
FIG. 3 is bottom view of a soft biomimetic legged robot according to an embodiment of the present invention.

As shown in FIGS. 1 to 3, a soft biomimetic legged robot includes a plurality of soft robotic arms 1, wherein the soft robotic arms 1 include a plurality of motion units 11, and each of the motion units (11) has one or more of twist modules 16, extension modules 17, contraction modules 18, and bending modules 19. The plurality of motion units 11 is combined to achieve a full-posture motion of the soft robotic arms 1.

The full-posture motion means that the soft robotic arm 1 is no longer confined to a single realization of elongation, contracting, bending, and twisting, but may realize different combinations of elongation, contracting, bending, and twisting.

In the present invention, not only the underwater swimming, crawling and crawling on lands or slopes of the soft biomimetic legged robot through the soft robotic arms 1 composed of different motion units 11 may be realized in order to adapt to more complex environments and achieve richer functions, but also the motion posture may be no longer confined to a single realization of elongation, contracting, bending, and twisting, so that the soft robotic arms 1 may achieve a full-posture motion while having a more complete motion form. Meanwhile, the structure of the soft robotic arm 1 is designed by means of modular concepts for achieve motion forms such as extension, contraction, bending and twisting with different modules, and the modularized segmented actuating takes into account the integrity of the motion of the soft robotic arm 1 and the convenience of control, so that problems of overly complicated structure and overly large volume caused by integration of too many actuators in the same soft robotic arm 1 are avoided.

Figure 5:
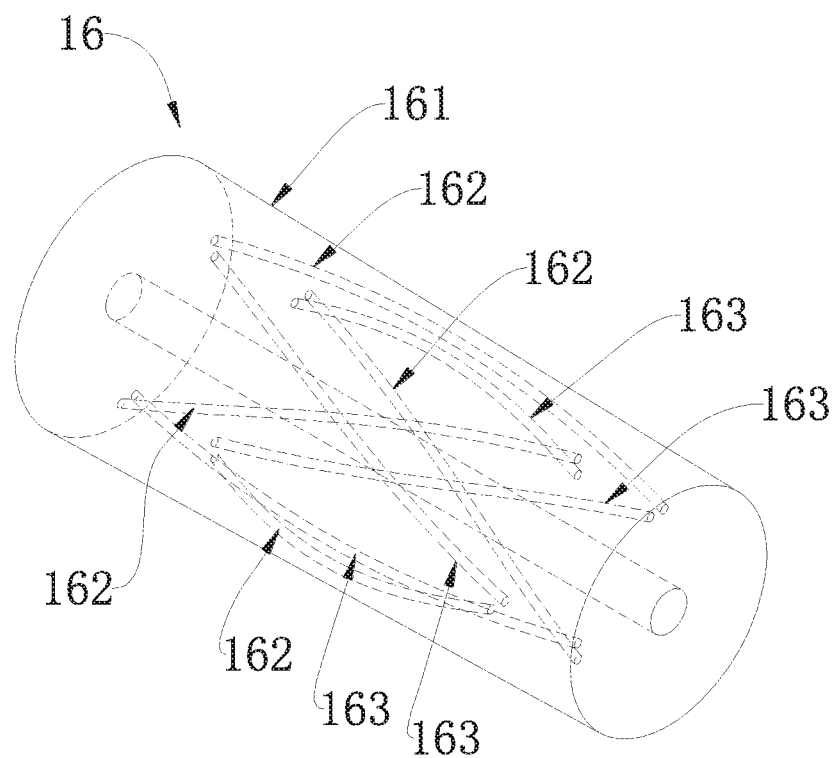
FIG. 5 is a structural diagram of an embodiment of a twist module.

Specifically, as shown in FIG. 5, the twist modules 16 include a first elastic substrate 161, a counter-clockwise twist actuator 163, and a clockwise twist actuator 162. Each of the counter-clockwise twist actuator 163 and the clockwise twist actuator 162 includes a plurality of actuators. The counter-clockwise twist actuators 163 are symmetrically disposed on the first elastic substrate 161 in a left-handed manner along a central axis of the first elastic substrate 161, and the clockwise twist actuators 162 are symmetrically disposed on the first elastic substrate 161 in a right-handed manner along the central axis of the first elastic substrate 161.

Among them, the first elastic substrate 161 is made of an elastic material, optionally a silica gel. The counter-clockwise twist actuator 163 and the clockwise twist actuator 162 comprise one of a shape memory alloy spring drive, a linear drive, a pneumatic drive, or a dielectric high elastomer drive. The counter-clockwise twist actuator 163 and the clockwise twist actuator 162 may be optionally the shape memory alloy spring drive, so that the shape memory alloy spring may be deformed after being energized so as to perform actuation.

When the counter-clockwise twist actuator 163 is energized to be heated, the shape memory alloy spring is energized to be contracted, and then each section of the first elastic substrate 161 is subjected to a counter-clockwise twist moment for rotating an end of the first elastic substrate 161 counter-clockwise with respect to a root, so that a function of counter-clockwise twisting of the twist modules 16 may be achieved. After the energization of the counter-clockwise twist driver 163 is stopped, the shape memory alloy spring actuates the first elastic substrate 161 to return to an initial state.

Similarly, when the clockwise twist actuator 163 is energized to be heated, the shape memory alloy spring is energized to be contracted, and then each section of the first elastic substrate 161 is subjected to a counter-clockwise twist moment for rotating an end of the first elastic substrate 161 clockwise with respect to a root, so that a function of clockwise twisting of the twist modules 16 may be achieved. After the energization of the clockwise twist driver 162 is stopped, the shape memory alloy spring actuates the second elastic substrate to return to an initial state.

Figure 6:
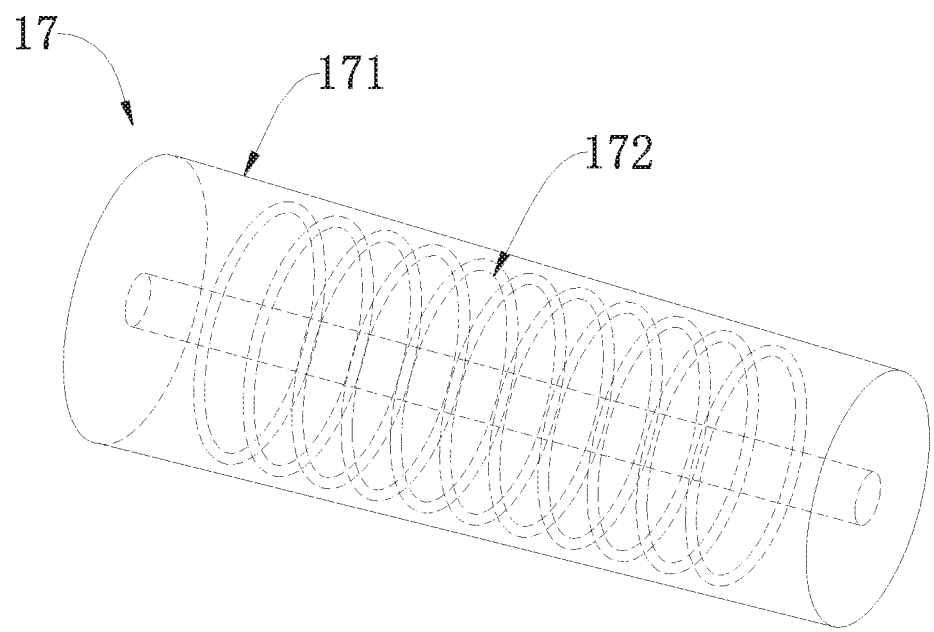
FIG. 6 is a structural diagram of an embodiment of an extension module.

Specifically, as shown in FIG. 6, the extension modules 17 include a second elastic substrate 171, and extension actuators 172. The extension actuators 172 are in a ring shape, and the extension actuators 172 are uniformly disposed on the second elastic substrate 171 along a generatrical direction of the second elastic substrate 171.

The second elastic substrate 171 is made of an incompressible material. The extension actuators 172 comprise one of a shape memory alloy spring drive and a chemical-reaction drive. The extension actuators 172 may be optionally the shape memory alloy spring, so that the shape memory alloy spring may be deformed after being energized so as to perform actuation.

When the extension actuators 172 are energized to be heated, the ring shape memory alloy spring is contracted uniformly inward, and since the shape memory alloy spring is uniformly distributed in the second elastic substrate 171, the second elastic substrate 171 is contracted inward by a radial force of the shape memory alloy spring. Meanwhile, since the second elastic substrate 171 is the incompressible material, it will extend along the axis, so that a function of extension of the extension modules 17 is achieved; after the energization of the extension actuators 172 is stopped, the shape memory alloy spring actuates the second elastic substrate 171 to return to an initial state.

Figure 7:
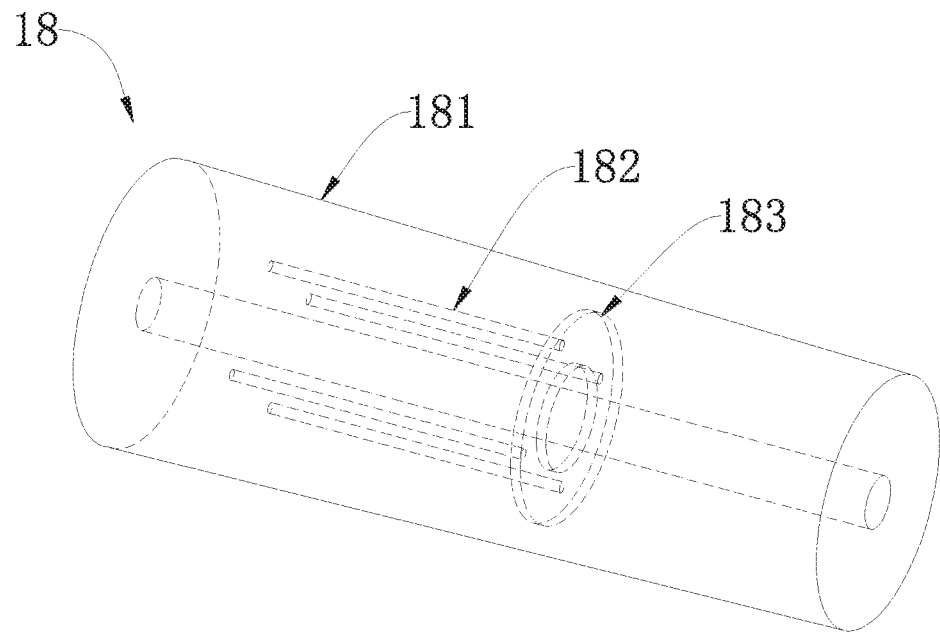
FIG. 7 is a structural diagram of an embodiment of a contraction module.

Specifically, as shown in FIG. 7, the contraction modules 18 include a third elastic substrate 181, contraction actuators 182, and stoppers 183. The contraction actuators 182 include a plurality of actuators, and the contraction actuators 182 are symmetrically disposed on the third elastic substrate 181 along a central axis of the third elastic substrate 181. The stoppers 183 are disposed on the third elastic substrate 181, and connected to one end of the contraction actuators 182.

The third elastic substrate 181 is made of an elastic material, optionally a silica gel. The stopper 183 is in a disk shape for homogenizing the force experienced by the contraction modules 18. The contraction actuators 182 comprise one of a shape memory alloy spring drive, and a linear drive. The contraction actuators 182 may be optionally the shape memory alloy spring drive, so that the shape memory alloy spring may be deformed after being energized so as to perform actuation.

When the contraction actuators 182 are energized to be heated, the shape memory alloy spring is shortened, and the stopper 183 forces the third elastic substrate 181 to experience uniformly-distributed loads and contract along the central axis of the third elastic substrate 181, so that a function of contraction of the contraction modules 18 is achieved.

Figure 8:
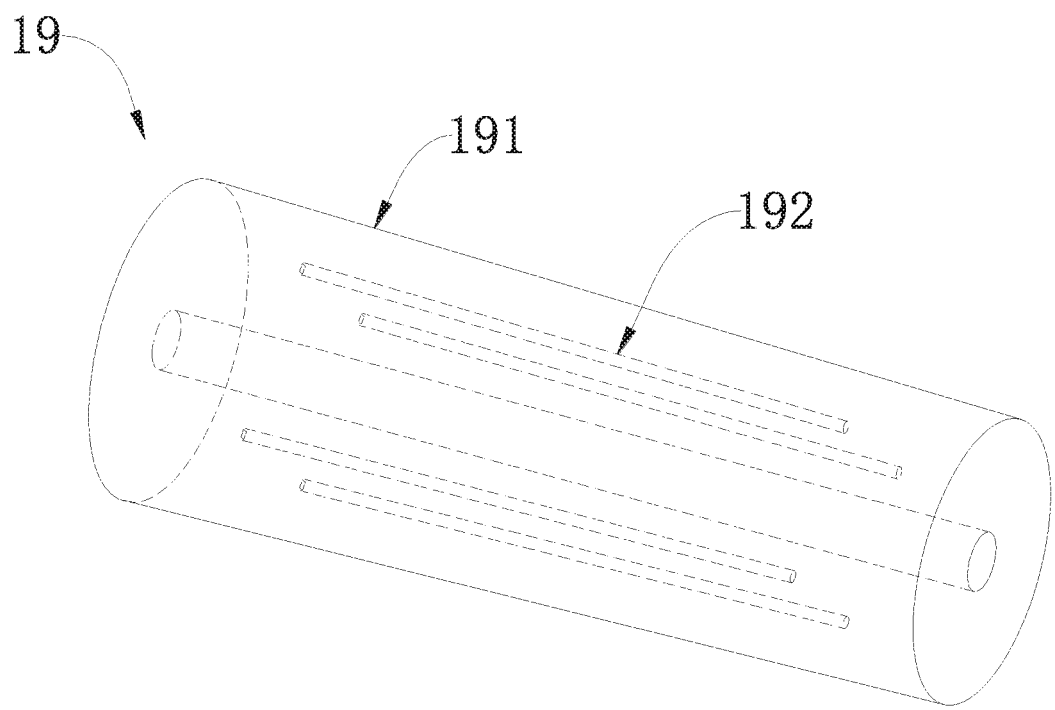
FIG. 8 is a structural diagram of an embodiment of a bending module.

Specifically, as shown in FIG. 8, the bending modules 19 include a fourth elastic substrate 191, and bending actuators 182. The bending actuators 192 include a plurality of actuators. The bending actuators 192 are uniformly disposed on the fourth elastic substrate 191 along a central axis of the fourth elastic substrate 191, and the bending actuators 192 are parallel to a generatrical direction of the fourth elastic substrate 191.

The fourth elastic substrate 191 is made of an elastic material, optionally a silica gel. The bending actuators 192 comprise one of a shape memory alloy spring drive, a linear drive, a pneumatic drive, or a dielectric high elastomer drive. The bending actuators 192 may be optionally the shape memory alloy spring drive, so that the shape memory alloy spring may be deformed after being energized so as to perform actuation.

When the bending actuators 192 are energized to be heated, the a generatrical direction of the fourth elastic substrate 191 bend in four different directions, respectively, or the bending in any direction may also be achieved by a combination of different bending shape memory alloy springs, so as to achieve a function of bending of the bending modules 19.

Specifically, the adjacent motion units 11 are integrally formed or detachably connected with each other. As such, when the adjacent motion units 11 are integrally formed with each other, the integrity of the soft robotic arm 1 is facilitated. When the adjacent motion units 11 are detachably connected with each other, different segments may be selected for combination according to actual needs, which may adapt to different working conditions.

Specifically, hoses 13 are disposed on the inside of the motion units 11, and the hoses 13 are filled inside with solid particles. When the inside of the hoses 13 is evacuated, the solid particles contact each other to squeeze, so that the rigidity of the soft robotic arms 1 increases.

Specifically, the motion units 11 at an end of the soft robotic arms 1 include pneumatic suckers 14, and the pneumatic suckers 14 are disposed uniformly along a generatrical direction of the motion units 11. Thus, with the pneumatic suckers 14, the soft robotic arm 1 may adsorb the target object.

Specifically, at least two of the soft robotic arms 1 are operating arms, and sensor module groups 15 are disposed on the operating arms. The sensor module groups 15 include: a recognition sensor, configured to detect basic attributes such as a shape and a color of a target object; a distance sensor, configured to detect information such as a position, an angle and a distance of the target object; a proximity sensor, configured to detect information such as a motion and a position of the target object; and a pressure sensor, configured to detect information such as a magnitude and a distribution of a pressure when the target object is held.

The soft biomimetic legged robot further includes a base 3, a flexible outer casing 2, a flexible battery 4, a micro camera 9, a built-in sensing module 7, and a control system, wherein the base 3 is detachably connected to the flexible outer casing 2, the insides of the base 3 and the flexible outer casing 2 form a mounting cavity, and the control system includes a DSP control module 5 and a wireless communication module 6. The flexible battery 4, the built-in sensing module 7, the DSP control module 5, and the wireless communication module 6 are located in the mounting cavity. The micro camera is embedded on the flexible outer casing 2.

The DSP control module 5 is wirelessly connected to an independent master module through the wireless communication module 6 for controlling the soft biomimetic legged robot remotely by the master module.

The flexible battery 4 powers the soft biomimetic legged robot, and the micro camera 9 is responsible for image acquisition and real-time observation. The built-in sensing module 7 mainly includes an ultrasonic sensor, a torque sensor, a speed and acceleration sensor, a temperature and humidity sensor, and the like.

The ultrasonic sensor is configured for navigation of soft biomimetic legged robot and avoid obstacles. The torque sensor is configured to monitor a torque of the main force part to provide a safety alert for the soft biomimetic legged robot. The speed and acceleration sensor is configured to detect a speed and an acceleration of an internal system of the soft biomimetic legged robot. The temperature and humidity sensor is configured to detect a temperature and a humidity of the surrounding environment to ensure the safety for the working environment of the soft biomimetic legged robot.

As shown in FIG. 3, a fastening module 8 is disposed between the base 3 and the soft robotic arm 1, and is mounted with a spherical ball 81 at a part thereof contacting with the ground. The soft robotic arms 1 are symmetrically disposed uniformly along a central axis of the base 3.

Figure 4:
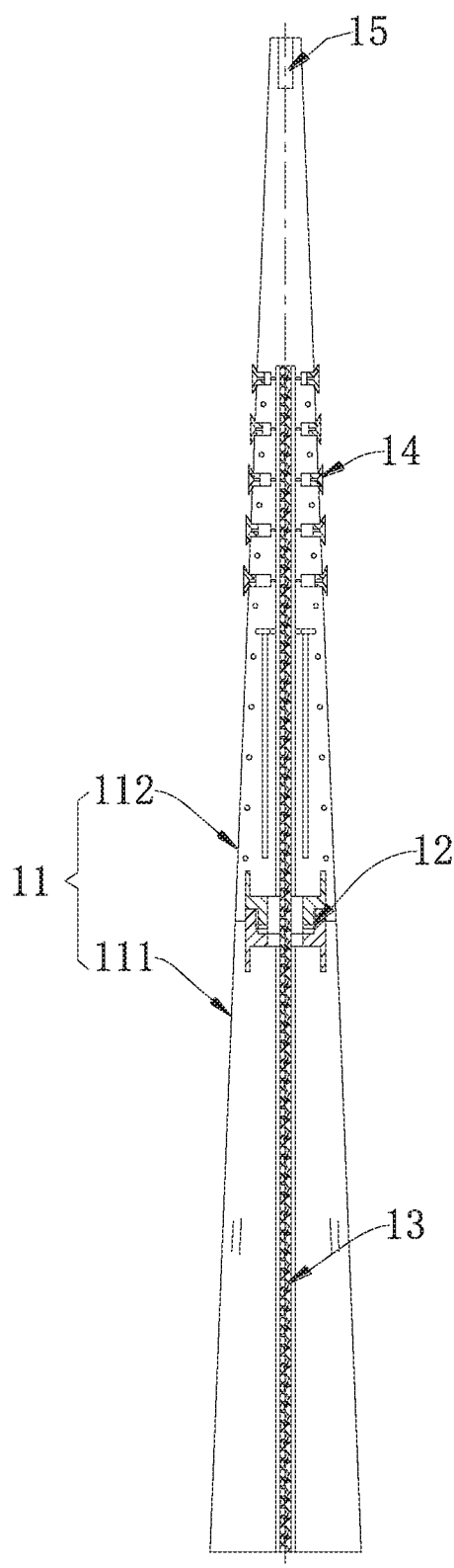
FIG. 4 is a structural diagram of an embodiment of a soft robotic arm.

According to one embodiment, as shown in FIGS. 1 and 4, the soft biomimetic legged robot includes eight soft robotic arms 1, each of the soft robotic arms 1 includes two motion units 11, which are a twist arm unit 111 and a telescopic arm unit 112, respectively, and the twist arm unit 111 is detachably connected to the telescopic arm unit 112 through a connecting member 12, wherein the twist arm unit 111 includes the twist modules 16 and the bending modules 19 to achieve twisting and bending. The telescopic arm unit 112 includes the extension modules 17, the contraction modules 18, and the bending modules 19, to achieve extension, contraction and bending, respectively. Thus, the twist arm unit 111 is combined with the telescopic arm unit 112 to form the soft robotic arm 1 for twisting the root, and achieving extension, contraction and bending of the end.

The soft robotic arm 1 is conical as a whole. In the twist modules 16, the first elastic substrate 161 has a conical shape and a center left with a cylindrical through hole. Each of the counter-clockwise twist actuator 163 and the clockwise twist actuator 162 includes four actuators. In the extension modules 17, the second elastic substrate 171 has a conical shape and a center left with a cylindrical through hole. In the contraction modules 18, the third elastic substrate 181 has a conical shape and a center left with a cylindrical through hole, and the contraction actuators 182 include four actuators. In the bending modules 19, the fourth elastic substrate 191 has a conical shape and a center left with a cylindrical through hole, and the bending actuators 192 include four actuators.

The connecting member 12 is a connecting ring with one end connected to the twist arm unit 111 and the other end connected to the telescopic arm unit 112, so that the twist arm unit 111 may be detachably connected to the telescopic arm unit 112.

Hoses 13 are disposed on the twist arm unit 111 and the telescopic arm unit 112, the hoses 13 are located in the through holes of the twist modules 16, the extension modules 17, the contraction modules 18 and the bending modules, and the hoses 13 are filled inside with solid particles. When the inside of the hoses 13 is evacuated, the solid particles contact each other to squeeze, so that the rigidities of the twist arm unit 111 and the telescopic arm unit 112 increase. Ends of the telescopic arm units 112 include pneumatic suckers 14, and the pneumatic suckers 14 are disposed uniformly along a generatrical direction of the telescopic arm units 112. Thus, with the pneumatic suckers 14, the telescopic arm units 112 may adsorb the target object.

To facilitate the subsequent description, the eight soft robotic arms 1 of the soft biomimetic legged robot are named according to their orientation, wherein four ones on the left are L1, L2, L3 and L4, and four ones on the right are R1, R2, R3 and R4, and wherein L1 and R1 are operating arms while the rest are moving arms.

During the process of holding by the soft biomimetic legged robot, the operating arm L1 (R1) first extends forward and bypasses the target object, the end sensor module detects a distance between the operating arm and the target object for feeding it back to a DSP control module 5, and then the DSP control module 5 is controlled to control the operating arm to move closer to the target object. The bending actuators 192 on the right side of the twist arm unit 111 and the twist arm unit 112 of the operating arm L1 are energized simultaneously with the bending actuators 192 on the left side of the twist arm unit 111 and the twist arm unit 112 of the operating arm R1, so that the operating arm L1 (R1) bends inwardly to surround the target object. The pneumatic suckers 14 are aerated to attract the operating arm to the surface of the target object. The bending actuators 192 above the operating arm L1 (R1) are energized to bend the operating arm upward, and then through the detection of a moment of the operating arm by an in-built sensing module 7, adjustment of a rigidity of the operating arm with changes in the filling degree of solid particles in the hoses 13 and detection of a pressure distribution and a degree of slip between the operating arm and the target object with the end sensing module, an air pressure of the pneumatic suckers 14 is changed, so as to achieve holding of the target object.

When the soft biomimetic legged robot crawls on a relatively flat ground, a combined motion of the moving arms L2 to L4 and R2 to R4 is required to achieve crawling. Specifically, the DSP control module 5 outputs a PWM signal to control the change amount of the actuators. First, the moving arms L3, R2 and R4 are treated as a group referred to a fixed group, and the twist actuators of the moving arms L3, R2 and R4 are energized to be heated to twist the soft robotic arms 1. Meanwhile, in the fixed group, the pneumatic suckers 14 are parallel to the ground, and the pneumatic suckers 14 are aerated to be adsorbed to the ground, so that the soft biomimetic legged robot has a fixed position. Then, the moving arms L2, R3 and L4 are treated as a group referred to as a mobile group, and in the mobile group L2, R3 and L4, the bending actuators 192 above the bending modules 19 in a plurality of the telescopic arm units 112 and the bending actuators 192 below the bending modules 19 in a plurality of the twist arm units 111 are energized simultaneously, so as to raise the mobile group upward. Then, extension actuators 172 of the extension modules 17 are energized to extend the mobile group forward. And then in the fixed group L3, R2 and R4, the bending actuators 192 on the right side of the moving arm L3 and the bending actuators 192 on the left side of the moving arms R2 and R4 are energized simultaneously to bend the fixed group inwardly, so that the soft biomimetic legged robot moves forward relative to the ground as a whole. When the soft biomimetic legged robot completes moving, the air pressure is removed from the pneumatic suckers 14, the fixed group is desorbed from the ground, the energization of the actuators stops, and then the moving arm returns to its normal shape. The fixed group is interchanged with the mobile group, and the two groups alternately swing, so as to achieve the motion of the soft biomimetic legged robot on a flat ground.

When the soft biomimetic legged robot moves on a slope with a large slope, the pneumatic suckers 14 of the moving arms L4 and R4 has to be moved and aerated to adsorb the L4 and R4 to the ground, and the hoses 13 inside the two increases the rigidity for functioning as a support at the tail. First, the pneumatic suckers 14 of the moving arms L3 and R3 are aerated to be adsorbed to the slope, and the clockwise twist actuator 162 in the moving arm L3 and the counter-clockwise twist actuator 163 in the moving arm R3 are energized simultaneously and twist in the opposite direction, so that the soft biomimetic legged robot is moved upward; then, the bending actuators 192 on the right side of the telescopic arm unit 112 and the twist arm unit 111 in the moving arm L4 and the bending actuators 192 on the left side of the telescopic arm unit 112 and the twist arm unit 111 in the moving arm R4 are energized simultaneously to bend the L4 and R4 inwardly, and subsequently, the pneumatic suckers 14 of the moving arms L4 and R4 are aerated and the hoses are evacuated to be adsorbed to the ground and function as a support. Second, the pneumatic suckers 14 of the moving arms L2 and R2 are aerated to be adsorbed to the slope, the actuation of the moving arms L3 and R3 is removed, and the clockwise twist actuator 162 of the moving arm L2 and the counter-clockwise twist actuator 163 of the moving arm R2 are energized simultaneously to move the soft biomimetic legged robot upward, so that the soft biomimetic legged robot may move on the slope with a large slope through cyclically twisting. With the combination of the motion in the flat ground and the slope with a large slope, the soft biomimetic legged robot may achieve the motion on the rough terrain.

When the soft biomimetic legged robot moves underwater, it remains a horizontal posture. First, the moving arms L2 and R2 remains bending outwardly, and the rest moving arms remain bending inwardly. When the soft biomimetic legged robot moves forward, the soft biomimetic legged robot is actuated to swing forward by changing a duty cycle of the PWM signal to prompt the moving arms L2 and R2 to bend inward quickly and swinging the rest moving arms outward quickly, and then the moving arms slowly returns to its original state, thereby forming a cycle. Through cyclically swinging the moving arms, the soft biomimetic legged robot may move straight underwater. When the soft biomimetic legged robot is required to rotate underwater, the bending actuators 192 on the right side of the twist arm unit 111 and the telescopic arm unit 112 in the moving arms L2 and L3 and the bending actuators 192 on the left side of the twist arm unit 111 and the telescopic arm unit 112 in the moving arms R2 and R3 are energized simultaneously to bend the moving arms, so that the soft biomimetic legged robot is actuated to rotate counterclockwise (clockwise) around a centroid spindle through an action on the soft robotic arm 1 from the water.

In the present invention, the soft robotic arm 1 is divided into two segments, but its structure is not limited herein. For the soft robotic arm 1, the matching mode of different modules may be changed according to different working conditions, and also a multi-segment structure may be adopted. For different working conditions, the combined matching mode of the motion modules may be changed as required for the soft robotic arm 1, such as changed as three segments, six segments, and the like.

According to one embodiment, the soft robotic arms 1 include three motion units 11 sequentially disposed along an extending direction of the soft robotic arms 1, which are a root motion unit, a middle motion unit, and an end motion unit. The root motion unit includes the bending modules 19 and the contraction modules 18 to achieve bending and contraction, respectively. The end motion unit includes the bending modules 19 and the contraction modules 18 to achieve bending and contraction, respectively. The root motion unit includes the bending modules 19 and the twist modules 16 to achieve bending and twisting, respectively. Thus, the soft biomimetic legged robot may move quickly on a flat ground under the action of the soft robotic arms.

According to one embodiment, the soft robotic arms 1 include three motion units 11 sequentially disposed along an extending direction of the soft robotic arms 1, which are a root motion unit, a middle motion unit, and an end motion unit. The root motion unit includes the bending modules 19 and the twist modules 16 to achieve bending and twisting, respectively. The end motion unit includes the bending modules 19 and the contraction modules 18 to achieve bending and contraction, respectively. The root motion unit includes the bending modules 19 and the extension modules 17 to achieve bending and extension, respectively. Thus, the soft biomimetic legged robot may survey in a narrow cave under the action of the soft robotic arms.

According to one embodiment, the soft robotic arms 1 include six motion units 11 sequentially disposed along the extending direction of the soft robotic arms 1, which are a first motion unit, a second motion unit, a third motion unit, a fourth motion unit, a fifth motion unit, and a sixth motion unit. The first motion unit includes the bending modules 19 and the contraction modules 18 to achieve bending and contraction, respectively. The second motion unit includes the bending modules 19 and the twist modules 16 to achieve bending and twisting, respectively. The third motion unit includes the bending modules 19 and the extension modules 17 to achieve bending and extension, respectively. The fourth motion unit includes the contraction modules 18 and the twist modules 16 to achieve contraction and twist, respectively. The fifth motion unit includes the contraction modules 18 and the extension modules 17 to achieve contraction and extension, respectively. The sixth motion module includes the extension modules 17 and the twist modules 16 to achieve extension and twisting, respectively. Thus, the soft biomimetic legged robot may perform complicated operations such as screwing valves and using tools under the action of the soft robotic arms.

The foregoing outlines features of several embodiments so that those skilled in the art may better understand the aspects of the present invention. Those skilled in the art should appreciate that they may readily use the present invention as a basis for designing or modifying other processes and structures for carrying out the same purposes and/or achieving the same advantages of the embodiments introduced herein. Those skilled in the art should also realize that such equivalent constructions do not depart from the spirit and scope of the present invention, and that they may make various changes, substitutions, and alterations herein without departing from the spirit and scope of the present invention.

What is claimed is:

1. A soft biomimetic legged robot, comprising:
a plurality of soft robotic arms (1), wherein the soft robotic arms (1) comprise a plurality of motion units (11), and each of the motion units (11) comprises one or more of twist modules (16), extension modules (17), contraction modules (18), and bending modules (19); wherein the plurality of motion units (11) is combined to achieve a full-posture motion of the soft robotic arms (1);
wherein hoses (13) are disposed in the motion units (11), and the hoses (13) are filled inside with solid particles; when the inside of the hoses (13) is evacuated, and the solid particles contact each other to squeeze, so that the rigidity of the soft robotic arms (1) increases.

2. The soft biomimetic legged robot according to claim 1, wherein the twist modules (16) comprise a first elastic substrate (161), a counter-clockwise twist actuator (163), and a clockwise twist actuator (162); each of the counter-clockwise twist actuator (163) and the clockwise twist actuator (162) comprises a plurality of actuators; the counter-clockwise twist actuators (163) are symmetrically disposed on the first elastic substrate (161) in a left-handed manner along a central axis of the first elastic substrate (161), and the clockwise twist actuators (162) are symmetrically disposed on the first elastic substrate (161) in a right-handed manner along the central axis of the first elastic substrate (161).

3. The soft biomimetic legged robot according to claim 2, wherein each of the counter-clockwise twist actuator (163) and the clockwise twist actuator (162) comprises one of a shape memory alloy spring drive, a linear drive, a pneumatic drive, or a dielectric high elastomer drive.

4. The soft biomimetic legged robot according to claim 1, wherein the extension modules (17) comprise a second elastic substrate (171) and extension actuators (172); the extension actuators (172) are in a ring shape, and the extension actuators (172) are uniformly disposed on the second elastic substrate (171) along a generatrical direction of the second elastic substrate (171).

5. The soft biomimetic legged robot according to claim 4, wherein the extension actuators (172) comprise one of a shape memory alloy spring drive and a chemical-reaction drive.

6. The soft biomimetic legged robot according to claim 1, wherein the contraction modules (18) comprise a third elastic substrate (181), contraction actuators (182), and stoppers (183); the contraction actuators (182) comprise a plurality of actuators, and the contraction actuators (182) are symmetrically disposed on the third elastic substrate (181) along a central axis of the third elastic substrate (181); the stoppers (183) are disposed on the third elastic substrate (181), and connected to one end of the contraction actuators (182).

7. The soft biomimetic legged robot according to claim 6, wherein the contraction actuators (182) comprise one of the shape memory alloy spring drive and the linear drive.

8. The soft biomimetic legged robot according to claim 1, wherein the bending modules (19) comprise a fourth elastic substrate (191) and bending actuators (182); the bending actuators (192) comprise a plurality of actuators; the bending actuators (192) are uniformly disposed on the fourth elastic substrate (191) along a central axis of the fourth elastic substrate (191), and the bending actuators (192) are parallel to a generatrical direction of the fourth elastic substrate (191).

9. The soft biomimetic legged robot according to claim 8, wherein the bending actuators (192) comprise one of the shape memory alloy spring drive, the linear drive, a pneumatic drive, and a dielectric high elastomer drive.

10. The soft biomimetic legged robot according to claim 1, wherein the adjacent motion units (11) are integrally formed or detachably connected with each other.

11. The soft biomimetic legged robot according to claim 1, wherein the motion units (11) at an end of the soft robotic arms (1) comprise pneumatic suckers (14), and the pneumatic suckers (14) are disposed uniformly on an outer surface thereof along a generatrical direction of the motion units (11).

12. The soft biomimetic legged robot according to claim 1, wherein at least two of the soft robotic arms (1) are operating arms, and the operating arms comprise sensor module groups (15), the sensor module groups comprising: a recognition sensor, configured to detect basic attributes such as a shape and a color of a target object; a distance sensor, configured to detect information such as a position, an angle and a distance of the target object; a proximity sensor, configured to detect information such as a motion and a position of the target object; a pressure sensor, configured to detect information such as a magnitude and a distribution of a pressure when the target object is held; and a slip sensor, configured to detect a degree of slip when the target object is held.

13. The soft biomimetic legged robot according to claim 1, wherein the soft robotic arms (1) comprise two motion units (11), which are a twist arm unit (111) and a telescopic arm unit (112), respectively, and the twist arm unit (111) is detachably connected to the telescopic arm unit (112) through a connecting member (12); the twist arm unit (111) comprises the twist modules (16) and the bending modules (19) to achieve twisting and bending; and the telescopic arm unit (112) comprises the extension modules (17), the contraction modules (18), and the bending modules (19), to achieve extension, contraction and bending, respectively.

14. The soft biomimetic legged robot according to claim 1, wherein the soft robotic arms (1) comprise three motion units (11) sequentially disposed along an extending direction of the robotic arms, which are a root motion unit, a middle motion unit, and an end motion unit; the root motion unit comprises the bending modules (19) and the contraction modules (18) to achieve bending and contraction, respectively; the middle motion unit comprises the bending modules (19) and the contraction modules (18) to achieve bending and contraction, respectively; and the end motion unit comprises the bending modules (19) and the twist modules (16) to achieve bending and twisting, respectively.

15. The soft biomimetic legged robot according to claim 1, wherein the soft robotic arms (1) comprise three motion units (11) sequentially disposed along the extending direction of the soft robotic arms (1), which are a root motion unit, a middle motion unit, and an end motion unit; the root motion unit comprises the bending modules (19) and the twist modules (16) to achieve bending and twisting, respectively; the middle motion unit comprises the bending modules (19) and the contraction modules (18) to achieve bending and contraction, respectively; and the end motion unit comprises the bending modules (19) and the extension modules (17) to achieve bending and extension, respectively.

16. The soft biomimetic legged robot according to claim 1, wherein the soft robotic arms (1) comprise six motion units (11) sequentially disposed along the extending direction of the soft robotic arms (1), which are a first motion unit, a second motion unit, a third motion unit, a fourth motion unit, a fifth motion unit, and a sixth motion unit; the first motion unit comprises the bending modules (19) and the contraction modules (18) to achieve bending and contraction, respectively; the second motion unit comprises the bending modules (19) and the twist modules (16) to achieve bending and twisting, respectively; the third motion unit comprises the bending modules (19) and the extension modules (17) to achieve bending and extension, respectively; the fourth motion unit comprises the contraction modules (18) and the twist modules (16) to achieve contraction and twist, respectively; the fifth motion unit comprises the contraction modules (18) and the extension modules (17) to achieve contraction and extension, respectively; and the sixth motion module comprises the extension modules (17) and the twist modules (16) to achieve extension and twisting, respectively.

17. A soft biomimetic legged robot, comprising:
a plurality of soft robotic arms (1), wherein the soft robotic arms (1) comprise a plurality of motion units (11), and each of the motion units (11) comprises one or more of twist modules (16), extension modules (17), contraction modules (18), and bending modules (19);
wherein the plurality of motion units (11) is combined to achieve a full-posture motion of the soft robotic arms (1);
wherein the extension modules (17) comprise a second elastic substrate (171) and extension actuators (172); the extension actuators (172) are in a ring shape, and the extension actuators (172) are uniformly disposed on the second elastic substrate (171) along a generatrical direction of the second elastic substrate (171).

18. A soft biomimetic legged robot, comprising:
a plurality of soft robotic arms (1), wherein the soft robotic arms (1) comprise a plurality of motion units (11), and each of the motion units (11) comprises one or more of twist modules (16), extension modules (17), contraction modules (18), and bending modules (19);
wherein the plurality of motion units (11) is combined to achieve a full-posture motion of the soft robotic arms (1);
wherein the motion units (11) at an end of the soft robotic arms (1) comprise pneumatic suckers (14), and the pneumatic suckers (14) are disposed uniformly on an outer surface thereof along a generatrical direction of the motion units (11).

\* \* \* \* \*